March 19, 1935.         P. J. MEEHAN         1,994,617
WRIST PIN LOCK
Filed April 19, 1934
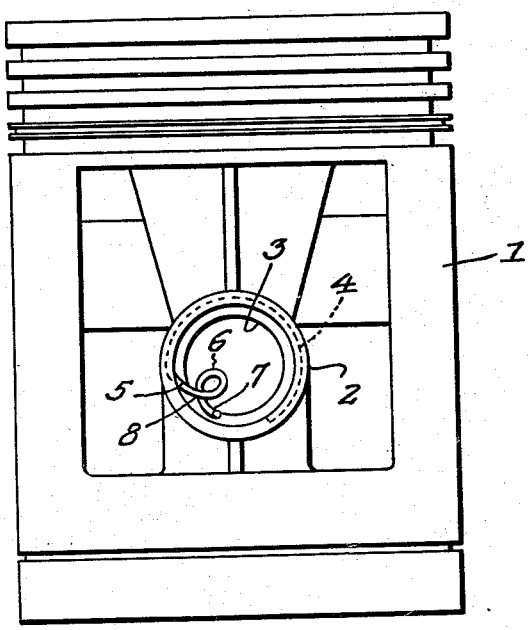
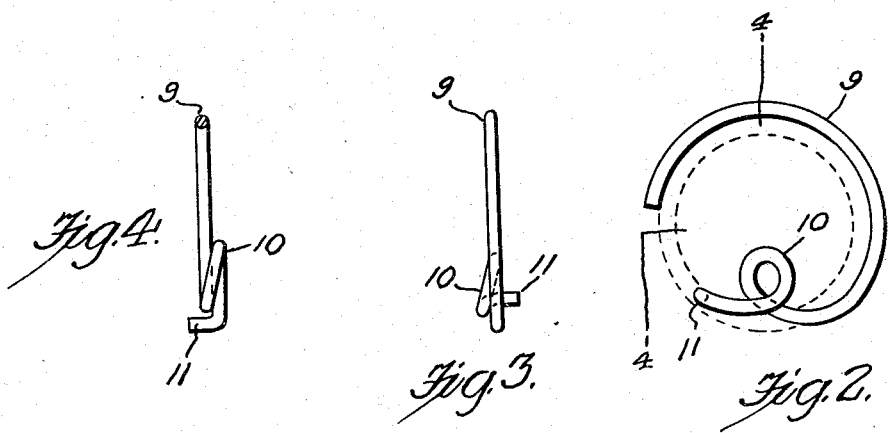
Inventor
Philip J. Meehan,
By Clarence A. O'Brien
Attorney Patented Mar. 19, 1935

1,994,617

UNITED STATES PATENT OFFICE 1,994,617

WRIST PIN LOCK

Philip J. Meehan, Philadelphia, Pa.

Application April 19, 1934, Serial No. 721,393

3 Claims. (Cl. 85—8.5)

This invention pertains to new and useful improvements in wrist pin locks for pistons and has for its primary object to provide, in a manner as hereinafter set forth, a locking ring embodying novel means for eliminating "knocking" caused by end float in pins of the full floating type by suppressing and cushioning the end float of the pin.

Another important object of the invention is to provide a wrist pin lock of the character described which may be conveniently installed in conventional pistons of the type using full floating wrist pins.

Other objects of the invention are to provide a wrist pin lock of the aforementioned character which will be comparatively simple in construction, strong, durable, highly efficient and reliable in use, and which may be manufactured at low cost.

Nine times out of ten, wrist pin knocks are not due to circumferential wear in either the wrist pin or its bushing, but are caused by end float of the pin, against each of its retaining lock wires.

The remedy for this was to dismantle the motor and fit oversize wrist pins, which was an expensive procedure. Since the advent of aluminum alloy pistons, even snugly fitted pins soon start to float and knock, due to heat expansion of the wrist pin hole. The manufacturers provided a plurality of oil holes to lubricate the movement of the floating pin in the piston, but nothing to prevent the pin from knocking up against its retaining lock wires.

My improvement in these wrist pin lock wires has dual purpose of providing a substantial wrist pin lock, and also to cushion and suppress the end float of the pin, so as to prevent knocking, without interfering with the circumferential floating of the pin, or without change in design of piston or pin or method of installation.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in side elevation of a piston, showing a wrist pin lock in accordance with the present invention installed therein.

Figure 2 is a view in side elevation of a slightly modified form of the invention.

Figure 3 is a view of the modification, taken at right angles to Figure 2.

Figure 4 is a sectional view through the modification, taken substantially on the line 4—4 of Figure 2.

Referring now to the drawing in detail, it will be seen that the reference numeral 1 designates a conventional piston of the type in widespread use at present in the internal combustion engines of automobiles. The piston 1, as usual, is provided with bearings 2 in which the end portions of a wrist pin 3 are journaled. Adjacent the ends of the wrist pin 3, the bearings 2 have formed therein circumferential grooves 4.

The lock constituting the present invention comprises a split, resilient, expansible ring 5, one of which is engaged in each of the grooves 4, as illustrated to advantage in Figure 1 of the drawing. Adjacent one end, the resilient ring 5 is formed to provide an inwardly directed loop 6 which terminates in a free end portion 7 engaged with the adjacent end of the wrist pin 3 for yieldingly resisting suppressing and cushioning end float of said wrist pin. The intersecting point 8 of the loop 6 and the ring 5 is located just inwardly of the inner periphery of the wrist pin 3. Further, it will be noted that the loop 6 passes the inner side of the ring 5, thus bracing or supporting the end portion 7 of the lock which engages the wrist pin.

In the modified form of the invention illustrated in Figures 2 to 4, inclusive, of the drawing, the reference numeral 9 designates a resilient, split, expansible ring which is formed to provide a resilient loop 10. The loop 10, it will be noted, passes adjacent the outer side of the ring 9 and terminates in an inturned end portion 11 which is engageable with the adjacent end of the wrist pin.

It will thus be seen that a lock of comparatively simple construction has been provided which will effectively suppress and cushion end float in piston wrist pins of the full floating type. As is believed to be readily apparent, the locks may be expeditiously installed by simply contracting the same by suitable means and inserting in the piston bearings 2 and then releasing, permitting the rings to expand and seat in the grooves 4.

It is believed that the many advantages of a wrist pin lock constructed in accordance with the present invention will be readily understood, and although preferred embodiments of the invention are as illustrated and described, it is to be understood that further modifications and changes in the details of construction may be resorted to which will fall within the scope of the invention as claimed.

What is claimed is:—

1. A wrist pin lock for pistons having wrist pin bearings provided with annular grooves, comprising a split, resilient ring engageable in the grooves, said ring including a resilient loop, said loop terminating in a free end portion engageable with the end of the wrist pin.

2. A wrist pin lock for pistons having wrist pin bearings provided with annular grooves, comprising a split, resilient ring engageable in the grooves, said ring including a resilient loop, said loop terminating in an angularly extending free end portion engageable with the end of the wrist pin.

3. A wrist pin lock of the class described comprising a split, resilient ring, and a resilient loop on one end of the ring for suppressing and cushioning end float of the wrist pin.

PHILIP J. MEEHAN.